UNITED STATES PATENT OFFICE.

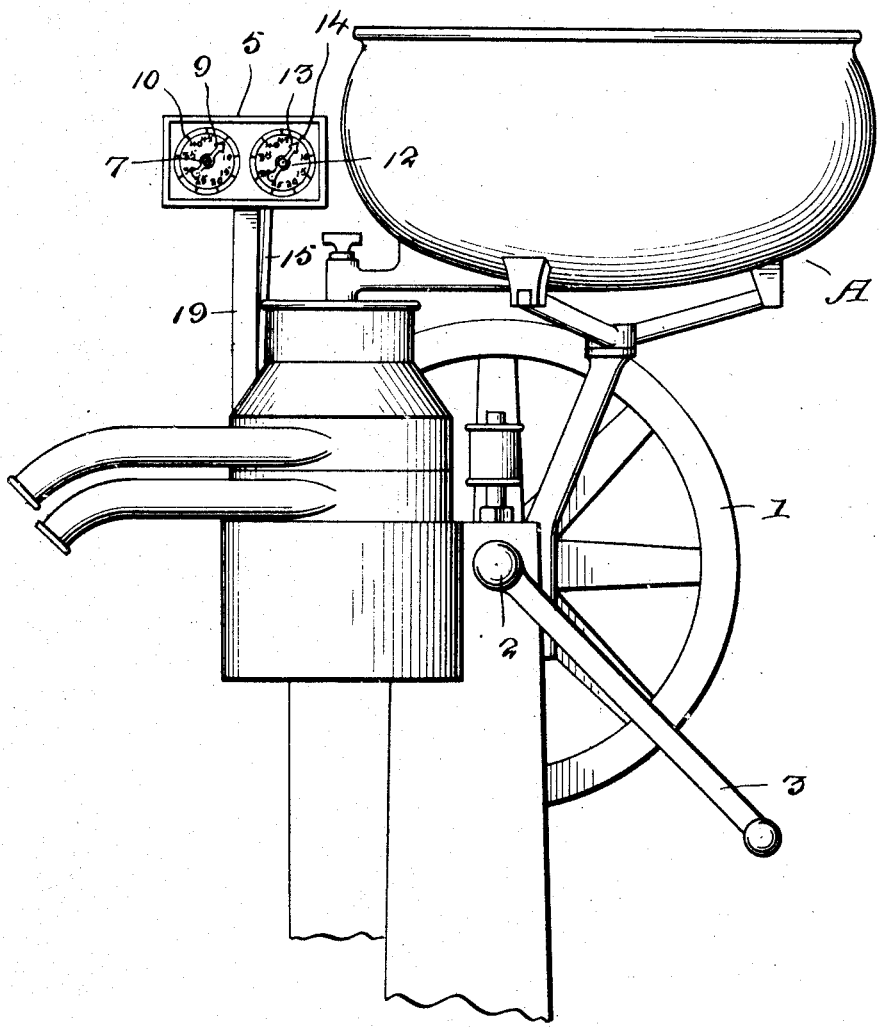

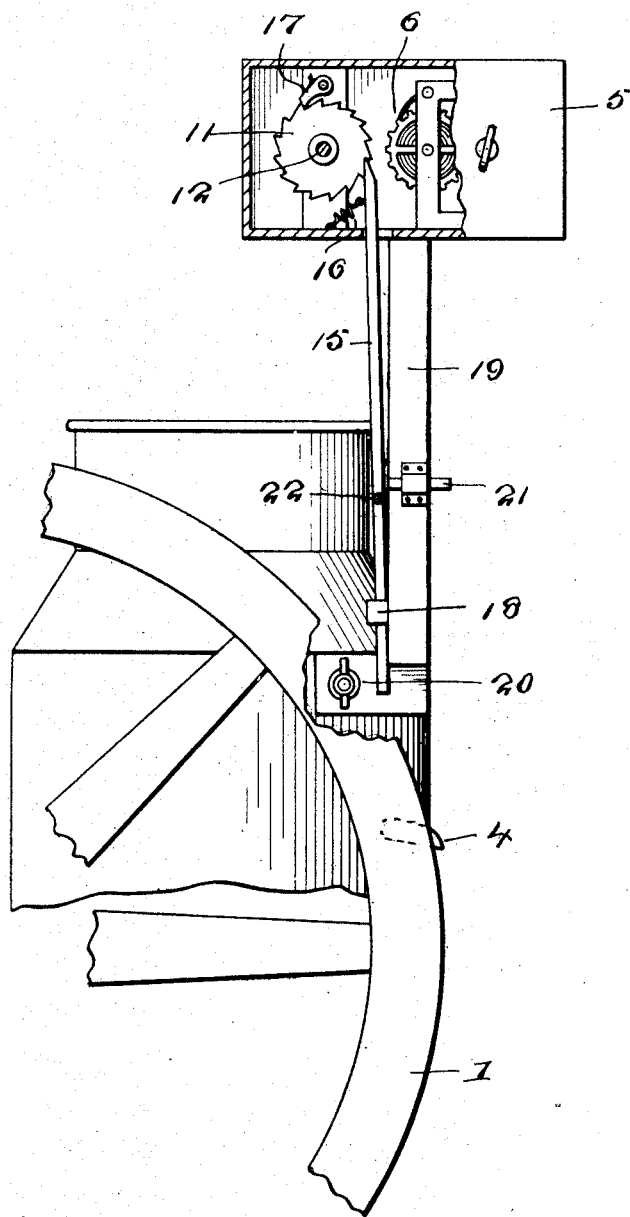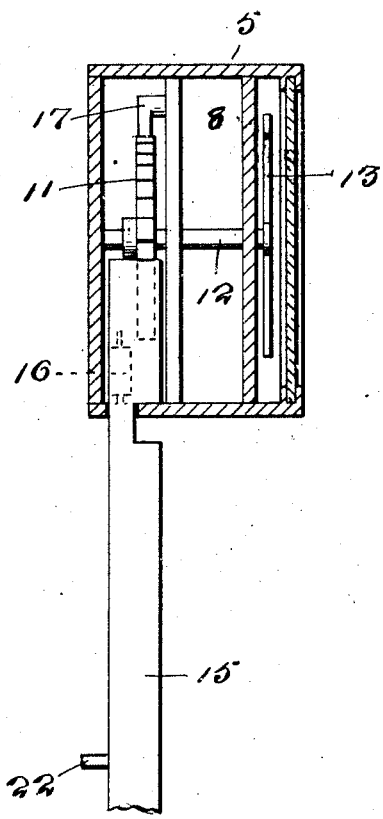

EMIL HAUTALA, OF BRUCE CROSSING, MICHIGAN.

SPEED-INDICATOR FOR SEPARATORS.

1,308,671.   Specification of Letters Patent.   Patented July 1, 1919.

Application filed July 26, 1918. Serial No. 246,900.

*To all whom it may concern:*

Be it known that I, EMIL HAUTALA, a citizen of the United States, residing at Bruce Crossing, in the county of Ontonagon and State of Michigan, have invented new and useful Improvements in Speed-Indicators for Separators, of which the following is a specification.

This invention relates to speed indicators and is especially adapted for use in conjunction with cream separators, the object in view being to provide a novel form of indicating means whereby the operator of the cream separator may actuate the driving shaft of the separator at a speed governed by another indicator actuated by clock mechanism.

In the operation of cream separators, to obtain the best results, the driving shaft of the separator should be rotated at a certain number of revolutions per minute. It is a difficult thing to judge or estimate with any degree of accuracy, the speed at which the cream separator is manually operated. By means of the improved indicating apparatus, the operator is enabled to judge accurately as to the proper speed of rotation of the separator during the entire operation thereof.

With the above and other objects in view, the invention consists in the construction, combination and arrangement of parts, as herein described, illustrated and claimed.

In the accompanying drawings:

Figure 1 is a fragmentary elevation of the cream separator, showing the speed indicator in its applied relation thereto.

Fig. 2 is an enlarged view of the indicator looking toward the indicating or dial side thereof.

Fig. 3 is a vertical longitudinal section through the indicator.

Referring to the drawings 1 designates the fly wheel of a cream separator which is conventionally shown at A and which is mounted on an operating crank shaft 2 having an operating crank handle 3.

In carrying out the present invention, I provide a single trip 4 which is mounted on the rim of the fly wheel 1 adjacent to the periphery thereof, the purpose of which will presently appear.

The speed indicator comprises a housing or casing 5 of suitable size to contain clock mechanism 6, an arbor 7 of which is extended through the front wall 8 of the casing where it has attached thereto a hand 9 which sweeps around a dial 10 mounted or otherwise represented on the face plate 8. The casing 5 also comprises an internally arranged toothed indicating wheel 11, the arbor or shaft 12 of which extends through the front wall of the casing, where it has fast thereon an indicating hand 13 which sweeps around another dial 14 mounted or otherwise represented on the face plate of the casing.

Coöperatively related to the wheel 11 is a reciprocatory thrust member or pawl 15, the upper extremity of which engages the teeth 11 and is yieldingly held in engagement therewith by means of a spring 16, allowing the upper extremity of the member 15 to snap successively into engagement with the teeth of said wheel. Backward movement of the wheel 11 is prevented by a spring pressed detent 17. The thrust member 15 extends downwardly through a guide 18 on the supporting post 19 of the casing 6, said post 19 being secured by fastening means 20, such as a screw or nut, to a fixed part of the machine, such as the machine frame. This enables the indicator to be removed from the cream separator and easily reapplied thereto. The thrust member 15 is actuated by the trip 4 which is carried by the wheel 1 of the cream separator. In each revolution of the wheel 1 and consequently the shaft 2 which is the driving shaft of the cream separator, an upward thrust is imparted to the member 15 which causes the wheel 11 to turn a distance equal to one tooth. The member 15 is retracted by means of the spring 16. When the indicating mechanism is not needed for immediate use, the thrust member 15 is raised and held out of the path of the trip 4 by means of a locking pin, bolt or latch 21 which is adapted to extend under a supporting shoulder 22 on the thrust member 15.

Assuming that the proper speed of rotation of the shaft 2 is "45" revolutions per minute, the clock mechanism is so designed and the parts of the mechanism thereof are so proportioned that the hand 9 will make one complete revolution or circuit of the dial in one minute and the dial will be graduated from "0" to "45". The other dial 14 will be graduated in the same way from "0" to "45", and therefore, the operator should operate the shaft 2 so that the hand 13 will sweep once around the dial for each complete circular movement of the hand 9 operated by the clock mechanism. All the operator has to do, is to turn the shaft 2 so that the hand 13 will travel at the same speed as the hand 9, as the hand 9 makes one complete circuit of the dial in one minute the hand 13, when the shaft 2 is turned at the proper speed, will make a complete circuit of the dial in the same time. The result is that the shaft 2 is operated at a speed of 45 revolutions per minute.

It will, of course, be understood that if a lower or higher speed is required, the dial 14 and the gear 11 may be modified to suit such change of speed.

I claim:—

1. In a speed indicator, the combination of an indicating hand mechanically driven at a predetermined speed, a dial in conjunction with which said indicating hand operates, a machine driving shaft, a second indicating hand actuated by a movable element of said machine, a second dial for the second named hand, the movement of said second named hand being manually variable, the means for actuating said second named hand, comprising a toothed wheel fast on the arbor of the last named hand, a thrust member coöperating with the teeth of said wheel, a wheel forming an element of said machine, and a trip carried by the last named wheel and coöperating with said thrust member.

2. In a speed indicator, the combination of an indicating hand, mechanically driven at a pre-determined speed, a dial in conjunction with which said indicating hand operates, a machine driving shaft, a second indicating hand actuated by a movable element of said machine, a second dial for the second named hand, the movement of said second named hand being manually variable, the means for actuating said second named hand comprising a toothed wheel fast on the arbor of the last named hand, and a thrust member coöperating with the teeth of said wheel and actuated by a movable element of said machine.

In testimony whereof I affix my signature.

EMIL HAUTALA.